US012696355B2

(12) United States Patent
Bader

(10) Patent No.: US 12,696,355 B2
(45) Date of Patent: Jul. 28, 2026

(54) GLOVE COMPRISING A HEATING DEVICE

(71) Applicant: DUPONT SAFETY & CONSTRUCTION, INC., Wilmington, DE (US)

(72) Inventor: Yves Bader, Crozet (FR)

(73) Assignee: DUPONT SAFETY & CONSTRUCTION, INC., Wilmington, DE (US)

(*) Notice: Subject to any disclaimer, the term of this patent is extended or adjusted under 35 U.S.C. 154(b) by 1145 days.

(21) Appl. No.: 17/591,962

(22) Filed: Feb. 3, 2022

(65) Prior Publication Data

US 2023/0247731 A1 Aug. 3, 2023

(51) Int. Cl.
*H05B 3/34* (2006.01)

(52) U.S. Cl.
CPC ....... *H05B 3/342* (2013.01); *H05B 2203/004* (2013.01); *H05B 2203/014* (2013.01); *H05B 2203/017* (2013.01); *H05B 2203/036* (2013.01)

(58) Field of Classification Search
CPC . H05B 3/342; H05B 3/34; H05B 3/00; H05B 2203/036
USPC .......................................................... 219/211
See application file for complete search history.

(56) References Cited

U.S. PATENT DOCUMENTS 3,781,514 A * 12/1973 Olson .............. A41D 19/01535 219/545
4,764,665 A * 8/1988 Orban .................... H05B 3/342 219/549
4,865,906 A * 9/1989 Smith, Jr. .............. D02G 3/443 428/374
6,021,523 A * 2/2000 Vero ...................... A41D 31/08 2/167
6,111,233 A * 8/2000 Rock ...................... H05B 3/342 219/545

(Continued)

FOREIGN PATENT DOCUMENTS

CN 104687549 A * 6/2015 ....... A41D 19/01535
KR 102016100 B1 5/2018

(Continued)

OTHER PUBLICATIONS

PCT International Search Report for Application No. PCT/US2023/061628; Frank van Voorst, Authorized Officer; ISA/EPO; Apr. 20, 2023.

*Primary Examiner* — Ibrahime A Abraham
*Assistant Examiner* — Lawrence H Samuels
(74) *Attorney, Agent, or Firm* — Ram W. Sabnis

(57) ABSTRACT

A glove for heating a hand comprises an upper section and a lower section wherein the upper section comprises in order a first outer protective layer comprising a first fabric or first leather skin, a heating pad, a second fabric, a temperature measuring device located on the inner surface of the second fabric, an electronic module located on the outer surface of the outer protective layer, wherein the heating pad comprises a fabric of staple fibers of pre-oxidized polyacrylonitrile and p-aramid and at least one conductive wire extending from the electronic module over at least part of the outer surface of the heating pad, the conductive wire being held in place on the inner surface of the heating pad by a fixing means. and the lower section comprises a second outer protective layer comprising a third fabric of continuous filament or staple fibers or a second leather skin.

8 Claims, 4 Drawing Sheets

(56) References Cited

U.S. PATENT DOCUMENTS 8,133,264 B1 * 3/2012 LaFontaine ............. A61F 7/007 2/125
2004/0164066 A1 * 8/2004 Ford .................. A41D 13/0051 219/528
2005/0214496 A1 9/2005 Borenstein
2008/0083720 A1 * 4/2008 Gentile .................... A43B 3/35 219/211
2009/0032520 A1 * 2/2009 Cronn .................... H05B 3/565 219/211
2011/0088138 A1 * 4/2011 Chen ...................... H05B 3/342 2/160
2011/0214221 A1 * 9/2011 Munda ................. A63B 71/141 2/161.1
2013/0152262 A1 * 6/2013 Bedetti ............ A41D 19/01529 2/16
2014/0238974 A1 * 8/2014 Nauditt ................. C04B 35/573 219/534
2015/0136754 A1 * 5/2015 Yester .............. A41D 19/01535 219/211
2015/0143609 A1 * 5/2015 Francisco Costa .......................... A41D 19/0065 2/167
2016/0235139 A1 * 8/2016 Gramlin ........... A41D 19/01535
2016/0287970 A1 * 10/2016 Charles ................ A41D 19/002
2018/0274136 A1 * 9/2018 Guo ........................ D03D 15/47
2019/0142086 A1 * 5/2019 Dunlop .................. A43B 3/355 219/211
2019/0233988 A1 * 8/2019 Harada .................. D02G 3/443
2020/0222686 A1 * 7/2020 Peiffer ................... A61N 1/303
2021/0251047 A1 * 8/2021 Brook .................... H05B 3/342

FOREIGN PATENT DOCUMENTS

WO 95/33358 A1 5/1995
WO 2014/027739 A1 5/2013

* cited by examiner

GLOVE COMPRISING A HEATING DEVICE

BACKGROUND OF THE INVENTION

1. Field of the Invention

This invention pertains to a glove that comprises a heating device that may be activated in cold weather. It is particularly suitable for use in gloves used by cyclists, motor cyclists as well as personnel who have to work in a cold environment.

2. Description of Related Art

U.S. Pat. No. 10,080,260 to Shin Bongchel discloses a fine heating wire having a small diameter that is applicable to various products. The fine heating wire is bendable, densely installed, and has high thermal efficiency. It includes a core formed with synthetic fiber material and a coil spirally wound around the outer portion of the core, The core connects one or more pairs of polyaramid fiber units. Each unit is formed by braiding dozens to hundreds of fine polyaramid fiber strands to maintain the diameter within 200-600 denier. The coil is formed of copper or copper alloy to withstand temperature rising up to 60° within five minutes when 3.7-12V power is supplied to maintain a resistance per unit length value equal to or greater than 0.5 Ω/m. The diameter of the fine heating wire is minimized to be installed inside a slim fiber and is bendable and densely installed to be applied to products, such as gloves and socks.

PCT publication WO 9533358 A1 to Silzars et al teaches an improved heating fabric that can be used in a wide variety of applications, including garments, and, at the same time, permits washability of the final article in addition to excellent heating performance. Specifically, the instant invention provides a heating fabric of textile filaments having incorporated therein at least one conductive yarn comprising substantially non-conductive filaments having at least about 10 weight % metal plated thereon, the conductive yarn being integrated into the fabric in a continuous resistive circuit having at least two terminals, the terminals being connected to an electric power source having a voltage of less than about 30, the conductive yarn being incorporated into the fabric in a density sufficient to provide at least about 5 watts per square foot of fabric when the power source is applied.

BRIEF SUMMARY OF THE INVENTION

This invention pertains to a glove for heating a hand 11 comprising an upper section 10 and a lower section 20 wherein:

- the upper section 10 comprises
  - a first outer protective layer 12 having an inner surface 18 and an outer surface 19, the first outer protective layer 12 comprising a first fabric or first leather skin or a combination of a first fabric and a first leather skin,
  - a heating pad 14 having an inner surface 14*a* and an outer surface 14*b*,
  - a second fabric 15 having an inner surface 15*a* and an outer surface 15*b*,
  - a temperature measuring device 13 located on the inner surface 15*a* of the second fabric 15,
  - an electronic module 30 located on the outer surface 19 of the outer protective layer 12 in the upper section 10 of the glove,

- a battery 32 located in a pocket on the inner surface 18 of the outer protective layer 12 in the upper section 10 of the glove,
- wherein the heating pad 14 comprises a fabric of staple fibers of pre-oxidized polyacrylonitrile and p-aramid and at least one conductive wire extending from the electronic module 30 over at least part of the inner surface 14*a* or outer surface 14*b* of the heating pad, the conductive wire being held in place on the inner surface 14*a* or outer surface 14*b* of the heating pad by a fixing means and
- the lower section 20 comprises a second outer protective layer 17 comprising a third fabric of continuous filament or staple fibers or a second leather skin or a combination of a third fabric and a second leather skin.

DETAILED DESCRIPTION OF THE INVENTION

Glove

A glove of this invention comprises an upper section 10 also known as a back part and a lower section 20 also known as a palm part.

Figure 1:
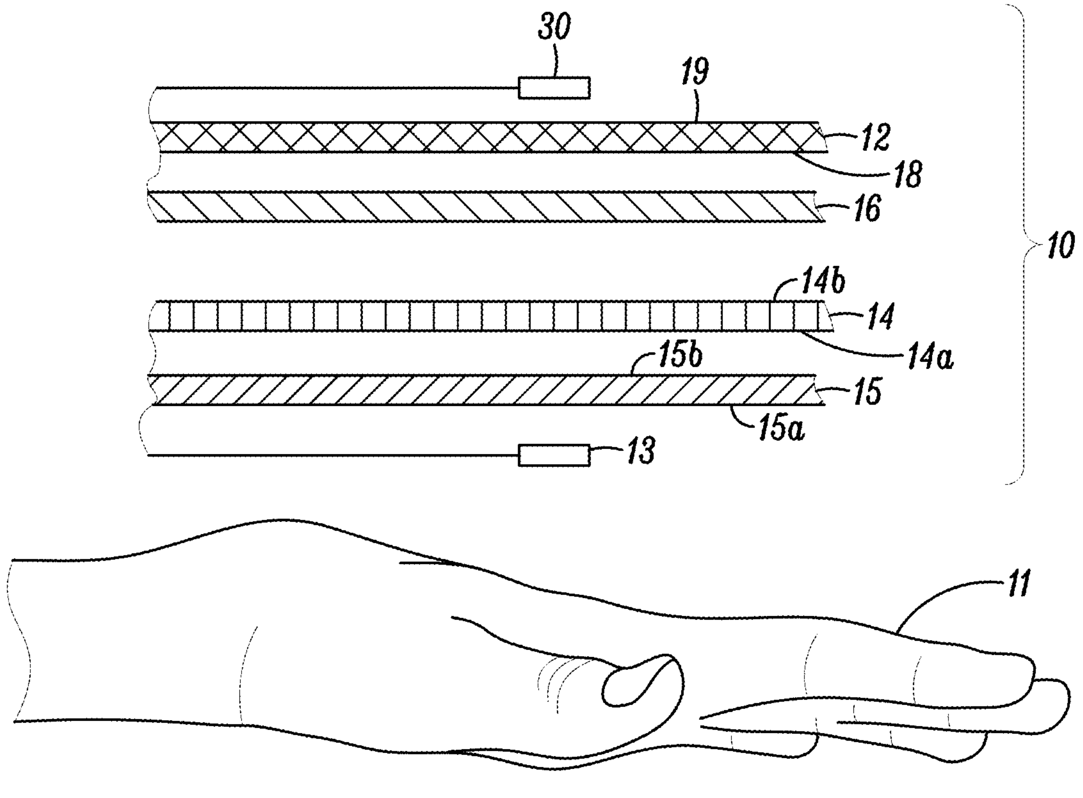
FIG. 1 is an expanded side view of the components comprising the upper section 10 of a glove that protects the back of a hand.

FIG. 1 shows generally at 10 an expanded view of the components comprising the upper section of a glove that protects the back of a hand 11 from exposure to cold.

Figure 2:
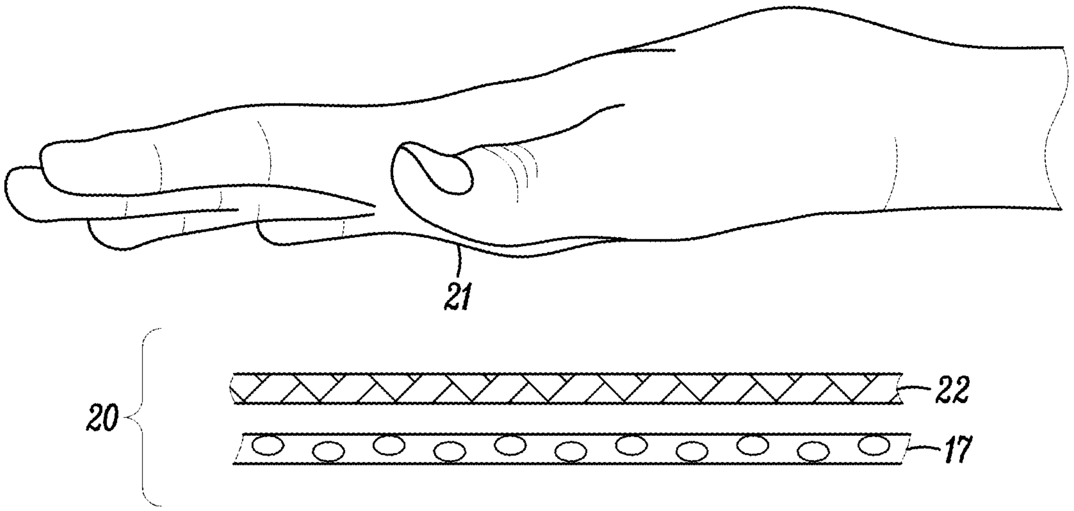
FIG. 2 is an expanded side view of the components of the lower section 20 of a glove that protects the palm of a hand.

FIG. 2 shows generally at 20 an expanded view of the components comprising the lower section of a glove that protects the palm of a hand 21.

In the context of this application, an inner surface of a layer is the surface closer (proximal) to the hand and an outer surface is the surface further away (distal) from the hand.

Components of the Upper Section of the Glove

As shown in FIG. 1, the components of the upper section 10 of the glove comprise in order:

- a first outer protective layer 12 having an inner surface 18 and an outer surface 19, the first outer protective layer 12 comprising a first fabric or first leather skin or a combination of a first fabric and a first leather skin,
- a heating pad 14 having an inner surface 14*a* and an outer surface 14*b*,
- a second fabric 15 having an inner surface 15*a* and an outer surface 15*b*,
- a temperature measuring device 13 located on the inner surface 15*a* of the second fabric,
- an electronic module 30 located on the outer surface 19 of the first outer protective layer in the upper section 10 of the glove,
- wherein the heating pad 14 comprises a fabric of staple fibers of pre-oxidized polyacrylonitrile and p-aramid and at least one conductive wire extending from the electronic module 30 over at least part of either the inner surface 14*a* or outer surface 14*b* of the heating pad, the conductive wire being held in place on the surface of the heating pad by a fixing means. Preferably the conductive wire is on the inner surface 14*a* of the heating pad.

In an alternative embodiment, the glove further comprises a water- impermeable membrane 16 located between the heating pad 14 and the first outer protective layer 12.

First Outer Protective Layer of Upper Section

When a first fabric is present as part of the first outer protective layer 12 the first fabric may be a woven or knit fabric for example a fabric made from aliphatic polyamide yarn such as Cordura® from Invista®. Preferably, the first fabric has an areal weight of about 200 gsm. The first fabric may also be waterproofed.

When a first leather skin is present as part of the first outer protective layer 12, the leather may be natural or synthetic. In some glove designs the first outer protective layer 12 may comprise a section of first fabric and another section of first leather skin. In another design the first leather skin may be placed on top of the first fabric.

Water-Impermeable Membrane of Upper Section

The membrane 16 is an optional feature that is waterproof but breathable. A suitable material is polytetrafluoroethylene (PTFE). Exemplary material combined with a cross-linked polyurethane coating is available from PIL Membranes Ltd, King's Lynn, England under the tradename Porelle®. Another suitable material is expanded polytetrafluoroethylene such as Gore-Tex from W. L. Gore, Newark, DE. An alternative membrane can be a TPU membrane.

Heating Pad of Upper Section

The fabric of heating pad 14 may be a non-woven, woven or knit fabric in which the yarns are staple fibers. An exemplary fabric style is a 2×2 twill. Typically the fabric has an areal weight of from 60 to 300 gsm. The heating pad 14 has an inner face 14*a* and an outer face 14*b*. Preferably the fabric comprises at least 30 weight % of oxidized polyacrylonitrile yarns and at least 30 weight % of p-aramid yarns, more preferably in the form of an intimate blend. Intimate blending is a technique of mixing two or more dissimilar fibers into a very uniform mixture and is well known in the textile arts. Oxidized polyacrylonitrile (OPAN) fiber is manufactured from a polyacrylonitrile precursor fiber (PAN). The PAN precursor fiber is solution spun and processed through a high temperature air oven to stabilize its molecular structure. An exemplary OPAN fiber is available from SGL Carbon under the tradename Panox. An exemplary p-aramid fiber is Kevlar® merge 1K292 from DuPont de Nemours Inc., Wilmington, DE. The OPAN fiber provides heat dissipation properties while the p-aramid fiber contributes to impact and abrasion resistance.

At least one conductive wire extends from the electronic module 30 over at least part of the inner surface 14*a* or outer surface 14*b* of the heating pad 14, the conductive wire being held in place on the inner surface 14*a* or outer surface 14*b* of the heating pad 14 by a fixing means. The fixing means may be a stitching yarn forming an embroidery pattern or an adhesive. The adhesive may have a nonwoven backing or scrim fabric to provide additional support. In some embodiments both an adhesive and stitching yarn may be used. When the fixing means is a stitching yarn, the embroidery pattern formed by the stitching yarn is preferably a chain stitch, a buttonhole stitch, a blanket stitch, a running stitch, a satin stitch or a cross stitch.

In one embodiment, at least one conductive wire extends from the electronic module 30 over at least part of at least one finger and over at least part of the back hand area of the inner surface 14*a* or outer surface 14*b* of the heating pad 14. In another embodiment, two conductive wires extend from the electronic module 30 over all the fingers and part of the back hand area of the inner surface 14*a* or outer surface 14*b* of the heating pad 14.

Second Fabric of Upper Section

Preferably the second fabric of the upper section is a knit fabric comprising cotton or polyester yarn. An intimate blend of cotton and polyester yarns may also be used.

Temperature Measuring Device of Upper Section

Any suitable temperature measuring device 13 may be used. Examples include a positive temperature coefficient (PTC) resistor, a negative temperature coefficient (NTC) resistor, a K thermocouple sensor or a platinum temperature sensor. In a preferred embodiment, the temperature detecting sensor 13 is a resistance temperature detector (PT1000).

Electronic Module of the Upper Section

Figure 3:
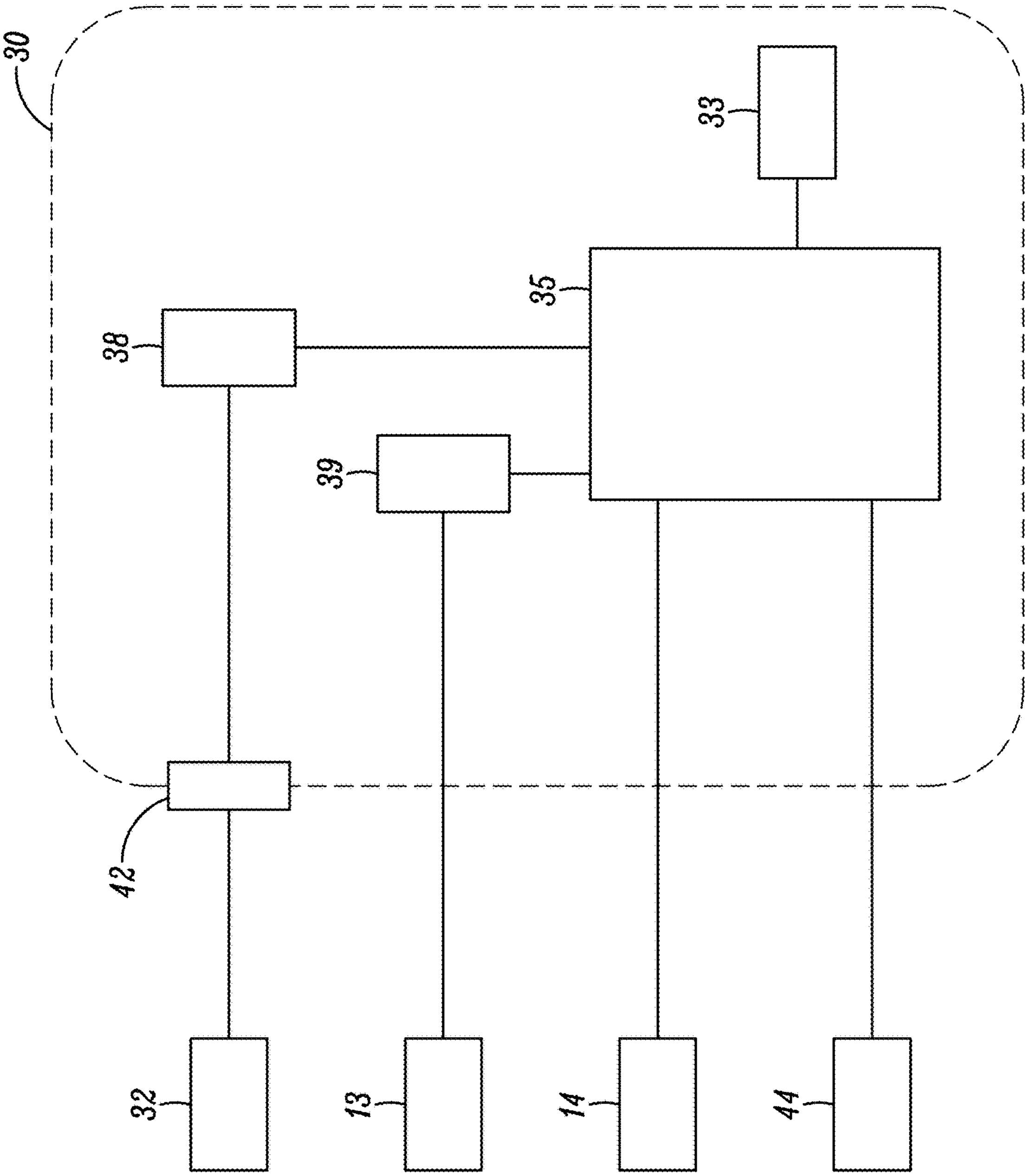
FIG. 3 is a general view of the major components and processing circuitry of the electronic module 30 component of the glove.
Figure 4:
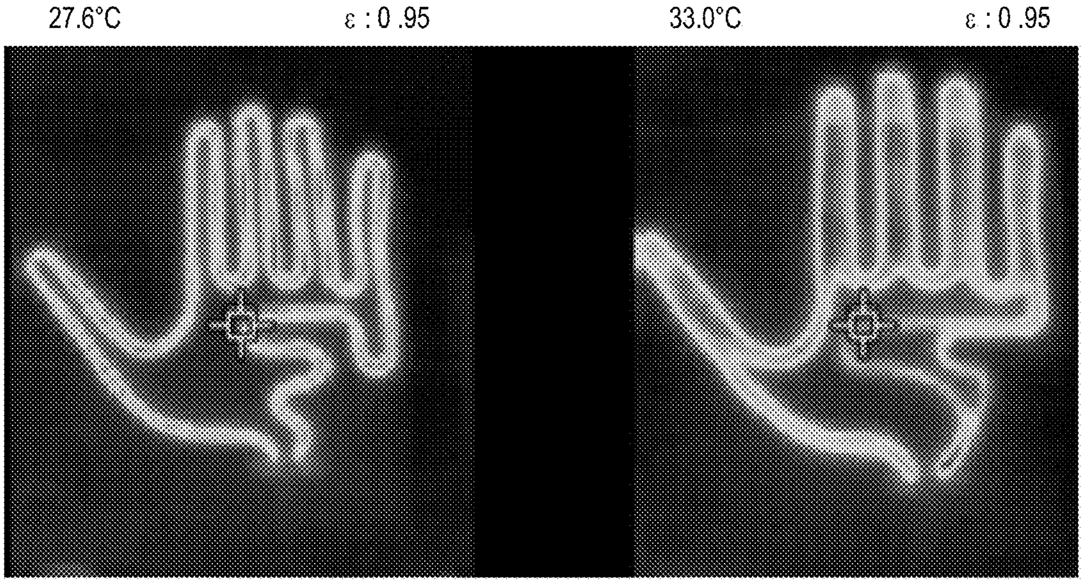
FIG. 4 is a thermal image infra-red heat map of an example of a glove of the present invention and a control example.

FIG. 3 shows a plan view of the electronic module component 30. The electronic module 30 is encapsulated in a watertight pouch either within or on the outer surface 19 of the glove preferably in the back wrist area of the glove. The electronic module 30 has a removable connection to a battery power source 32. It is desirable that the battery power source 32 is located in a pocket within the glove, preferably on the inner surface 18 of the first outer protective layer 12 and can be removed from the pocket for charging or when the glove is being washed. The back wrist area of the glove is a preferred location for the battery power source 32.

The electronic module component 30 comprises an accelerometer 33 that activates or deactivates the battery power source as a result of hand movement of the glove, and a digital processor 35 wherein the processor receives live temperature data input received from the temperature detecting sensor 13 and predicts via an algorithm whether to provide heat to heating pad 14 or maintain heat or turn off heat. The temperature detecting sensor 13 is connected to a temperature sensor driver 39.

Other elements of the module are a battery power gauge 38, a charging bay connector 42 and an external on/off switch 44. Preferably this external switch is located on the glove. Connector 42 which is located in a pocket on the inner surface 18 of the outer protective layer 12 allows removal of the battery 32 for charging.

Any suitable battery may be used with a lithium battery or a ceramic lithium battery being representative examples.

Components of the Lower Section of the Glove

As shown in FIG. 2, the components 20 of the lower section of the glove comprise a second outer protective layer 17 comprising a third fabric of continuous filament or staple fibers or a second leather skin or a combination of a third fabric and a second leather skin. In some designs, the second leather skin may be placed on top of the third fabric. This component provides impact and abrasion resistance to the glove. Suitable yarns for the third fabric include p-aramid or cotton. Where there is a second leather skin present this may be natural or synthetic leather.

In some embodiments, a fabric liner 22 is located next to the innermost (proximal) surface of the second outer protective layer 17. This liner provides protection against heat and abrasion. A knit is a preferred fabric style for fabric liner 22 because of its flexibility in the palm area. The fibers of the fabric liner 22 may comprise aromatic polyamid, aliphatic polyamid, polyethylene, polyethylene terephthalate, cotton, wool or blends thereof.

Compliance Standards

The glove construction is in compliance with the following performance standards:

EN 13594:2015 (Protective Gloves for Motorcycle Riders—Requirements and Test Methods).

EN 388:2016 (Protective Gloves Against Mechanical Risks).

EN 511:2006 (Protective Gloves Against Cold)

EXAMPLES

Example 1

A 2×2 twill woven fabric heating pad 14 having an areal weight of 250 gsm was made from an intimate blend of 50 weight percent of p-aramid Kevlar® K29 and 50 weight percent of pre-oxidized acrylonitrile spun yarns. The Kevlar® fiber was from Dupont and the pre-oxidized acrylonitrile fiber was Panox® grade T320-1.7/1.39-A110 from Filtes International, Capriolo, Italy.

The fabric heating pad 14 was cut into the shape of a hand. Two non-insulated stainless steel 316L heating wires each having a linear density of 1.12 g/m and a resistivity of 6 ohm/m were arranged in parallel on one side of the fabric pad 14 and held in place by a finger shaped quilting pattern using polyester yarn. The two wires covered the finger portion of the hand and never crossed each other. The total impendence of the wiring was 5.1 ohms.

Comparative Example A

This fabric heating pad 14 was prepared in a similar way to Example 1 except that the fabric was a needle punched white polyester nonwoven fabric having an areal weight of 60 gsm and only one stainless steel 316L heating wire was incorporated into the pad. The heating wire had a linear density of 2.3 g/m and a resistivity of 2.4 ohm/m. The total impendence of the wiring was 5.1 ohm.

Heating Test

A battery of 7.4V with a maximum current of 1.45 A was connected to the heating pad wires delivering an energy of 10 W. An infrared camera monitored the temperature rise on the surface of the fabric heating pad 14. After 60 seconds the temperature rise of Example 1 was 33° C. while that for the Comparative Example was only 27.6° C. demonstrating the advantage in warming effect provided by the construction of Example 1. Further, the heat coverage area of the fingers of Example 1 was significantly better thus providing better comfort and lower energy consumption for the same heat feeling.

The invention claimed is:

1. A glove for heating a hand, the glove comprising a back of hand part and a palm of hand part, said glove comprising an upper section (10) for the back of hand part and a lower section (20) for the palm of hand part wherein:

the upper section (10) comprises, in order a first outer protective layer (12) having an inner surface (18) and an outer surface (19), the first outer protective layer (12) comprising a first fabric or first leather skin or a combination of a first fabric and a first leather skin, a heating pad (14) having an inner surface (14*a*) and an outer surface (14*b*), a second fabric (15) having an inner surface (15*a*) and an outer surface (15*b*), a temperature measuring device (13) located on the inner surface (15*a*) of the second fabric, an electronic module (30) located on the outer surface (19) of the first outer protective layer (12) in the upper section (10) of the glove, wherein the heating pad (14) comprises a fabric of staple fibers of pre-oxidized polyacrylonitrile and p-aramid and is connected to the electronic module (30) and the lower section (20) comprises a second outer protective layer (17) comprising a third fabric of continuous filament or staple fibers or a second leather skin or a combination of a third fabric and a second leather skin.

2. The glove of claim 1 further comprising a thermally insulating waterproof membrane (16) positioned between the first outer protective layer (12) and the heating pad (14) in the upper section (10) of the glove.

3. The glove of claim 1 wherein the staple fibers of the heating pad fabric (14) comprise at least 30 weight % of oxidized polyacrylonitrile and at least 30 weight % of p-aramid.

4. The glove of claim 1 wherein the heating pad fabric (14) is a non-woven, woven or knit fabric.

5. The glove of claim 1 further comprising a fabric liner (22) in the lower section of the glove, the liner (22) being located next to the innermost surface of the second outer protective layer (17).

6. The glove of claim 1 wherein the electronic module (30) comprises an accelerometer (33) that connects to a battery power source (32).

7. The glove of claim 1 wherein the third fabric comprises p-aramid or cotton.

8. The glove of claim 5 wherein the fabric liner (22) comprises aromatic polyamid, aliphatic polyamid, polyethylene, polyethylene terephthalate, cotton, wool or blends thereof.

* * * * *